(12) United States Patent
Lebeau et al.

(10) Patent No.: US 12,720,287 B2
(45) **Date of Patent: *Aug. 25, 2026**

(54) ROUTING QUERIES BASED ON CARRIER PHRASE REGISTRATION

(71) Applicant: Google LLC, Mountain View, CA (US)

(72) Inventors: Michael J. Lebeau, New York, NY (US); John Nicholas Jitkoff, Palo Alto, CA (US); William J. Byrne, Davis, CA (US)

(73) Assignee: Google LLC, Mountain View, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 18/668,554

(22) Filed: May 20, 2024

(65) Prior Publication Data

US 2024/0305963 A1 Sep. 12, 2024

Related U.S. Application Data

(63) Continuation of application No. 17/820,810, filed on Aug. 18, 2022, now Pat. No. 12,010,597, which is a (Continued)

(51) Int. Cl.
*G10L 15/22* (2006.01)
*G10L 15/08* (2006.01)
(Continued)

(52) U.S. Cl.
CPC ............... *H04W 4/50* (2018.02); *G10L 15/08* (2013.01); *G10L 15/1822* (2013.01);
(Continued)

(58) Field of Classification Search
CPC ..... G10L 15/22; G10L 15/1822; G06F 3/167; G06F 40/279; G06F 40/289
See application file for complete search history.

(56) References Cited

U.S. PATENT DOCUMENTS 5,384,892 A 1/1995 Strong
5,513,298 A 4/1996 Stanford et al.
(Continued)

OTHER PUBLICATIONS

Bulyko et al. "Web Resources for Language Modeling in Conversational Speech Recognition," ACM Trans. on Speech and Language Processing, Dec. 2007, 25 pages.
(Continued)

*Primary Examiner* — Daniel Abebe
(74) *Attorney, Agent, or Firm* — Honigman LLP; Brett A. Krueger; Grant Griffith

(57) ABSTRACT

In general, the subject matter described in this specification can be embodied in methods, systems, and program products for receiving a voice query at a mobile computing device and generating data that represents content of the voice query. The data is provided to a server system. A textual query that has been determined by a speech recognizer at the server system to be a textual form of at least part of the data is received at the mobile computing device. The textual query is determined to include a carrier phrase of one or more words that is reserved by a first third-party application program installed on the computing device. The first third-party application is selected, from a group of one or more third-party applications, to receive all or a part of the textual query. All or a part of the textual query is provided to the selected first application program.

20 Claims, 7 Drawing Sheets

Related U.S. Application Data continuation of application No. 16/747,814, filed on Jan. 21, 2020, now Pat. No. 11,438,744, which is a continuation of application No. 15/878,514, filed on Jan. 24, 2018, now Pat. No. 10,582,355, which is a continuation of application No. 15/196,429, filed on Jun. 29, 2016, now Pat. No. 9,894,460, which is a continuation of application No. 14/259,540, filed on Apr. 23, 2014, now Pat. No. 9,570,077, which is a continuation of application No. 12/851,666, filed on Aug. 6, 2010, now Pat. No. 8,731,939.

(51) Int. Cl.

*G10L 15/18* (2013.01)
*G10L 15/26* (2006.01)
*H04L 67/02* (2022.01)
*H04L 67/53* (2022.01)
*H04M 1/27* (2006.01)
*H04W 4/50* (2018.01)
*H04W 4/60* (2018.01)

(52) U.S. Cl.

CPC .............. *G10L 15/26* (2013.01); *H04L 67/02* (2013.01); *H04L 67/53* (2022.05); *H04M 1/271* (2013.01); *H04W 4/60* (2018.02); *G10L 2015/223* (2013.01)

(56) References Cited

U.S. PATENT DOCUMENTS 5,632,002 A * 5/1997 Hashimoto ............. G06F 3/165 704/231
5,732,395 A 3/1998 Alexander Silverman
6,233,559 B1 5/2001 Balakrishnan
6,363,348 B1 3/2002 Besling et al.
6,493,731 B1 12/2002 Jones et al.
6,549,952 B1 4/2003 Plassmann et al.
6,654,734 B1 11/2003 Mani et al.
6,748,361 B1 6/2004 Comerford et al.
7,013,282 B2 3/2006 Schrocter
7,053,752 B2 5/2006 Wang et al.
7,349,896 B2 3/2008 Chowdhury et al.
7,363,228 B2 4/2008 Wyss et al.
7,372,976 B2 5/2008 Rhoads et al.
7,412,391 B2 8/2008 Nakagawa et al.
7,447,638 B1 * 11/2008 Grant ...................... G06F 3/167 704/E15.044
7,672,851 B2 3/2010 Gurram et al.
7,814,204 B1 10/2010 Wang et al.
7,877,258 B1 1/2011 Chelba et al.
8,005,673 B2 8/2011 Nagashima
8,165,886 B1 4/2012 Gagnon et al.
8,370,146 B1 2/2013 Schalkwyk et al.
8,374,879 B2 2/2013 Falcon et al.
8,407,239 B2 3/2013 Dean et al.
8,543,407 B1 9/2013 Gagnon et al.
8,682,661 B1 3/2014 Schalkwyk et al.
8,880,405 B2 11/2014 Cerra et al.
8,924,219 B1 * 12/2014 Bringert ............. G06F 3/04842 704/275
8,996,379 B2 3/2015 Cerra et al.
10,839,158 B2 11/2020 Ji et al.
2002/0065654 A1 * 5/2002 Grant .................... G10L 15/193 704/E15.044
2002/0065955 A1 5/2002 Gvily
2002/0193998 A1 12/2002 Dvorak
2003/0149561 A1 8/2003 Zhou
2003/0171929 A1 9/2003 Falcon et al.
2003/0236664 A1 12/2003 Sharma
2004/0024745 A1 2/2004 Jeng et al.
2005/0102259 A1 5/2005 Kapur
2006/0155685 A1 7/2006 Grim et al.
2007/0050191 A1 3/2007 Weider et al.
2007/0050338 A1 3/2007 Strohm et al.
2007/0094033 A1 4/2007 Nagashima et al.
2007/0100636 A1 5/2007 Hirota et al.
2007/0112571 A1 5/2007 Thirugnana
2007/0136263 A1 6/2007 Williams
2008/0059186 A1 3/2008 Mowatt et al.
2008/0059195 A1 * 3/2008 Brown .................... G10L 15/22 704/270
2008/0140626 A1 6/2008 Wilson
2008/0208585 A1 8/2008 Ativanichayaphong et al.
2008/0270135 A1 10/2008 Goel et al.
2008/0300886 A1 12/2008 Patch
2009/0030697 A1 1/2009 Cerra et al.
2009/0094382 A1 4/2009 Tsimelzon et al.
2009/0171659 A1 7/2009 Pearce et al.
2009/0171663 A1 7/2009 Badt et al.
2009/0171664 A1 7/2009 Kennewick et al.
2009/0171669 A1 7/2009 Engelsma et al.
2009/0216538 A1 8/2009 Weinberg et al.
2009/0299745 A1 12/2009 Kennewick et al.
2010/0185448 A1 * 7/2010 Meisel .................... G06F 3/167 704/E15.005
2010/0286985 A1 11/2010 Kennewick et al.
2010/0312782 A1 12/2010 Li et al.
2011/0035220 A1 2/2011 Opaluch
2011/0054898 A1 3/2011 Phillips et al.
2011/0054900 A1 3/2011 Phillips et al.
2011/0055256 A1 3/2011 Phillips et al.
2011/0106534 A1 5/2011 LeBeau et al.
2011/0131045 A1 6/2011 Cristo et al.
2011/0196668 A1 8/2011 Shu et al.
2011/0288859 A1 * 11/2011 Taylor ................... G10L 15/005 704/E21.001
2012/0078874 A1 3/2012 Gonzalez et al.
2012/0191448 A1 7/2012 Lloyd et al.
2012/0310941 A1 12/2012 MacDonald et al.
2015/0243283 A1 8/2015 Halash et al.
2017/0200450 A1 7/2017 Dragosh et al.

OTHER PUBLICATIONS

Lumen Vox, "Grammars," retrieved on Jul. 31, 2010, http://www.lumenvox.cmn/pdf/grammars.pdf, 9 pages.
Taylor, P.A. "Concept-to-Speech Synthesis by Phonological Structure Matching," Center for Speech Technology Research, University of Edinburgh; The Royal Society, 2000, 14 pages.
Notice of Allowance from U.S. Appl. No. 12/851,666, mailed Sep. 30, 2016, 6 pages.
Notice of Allowance from U.S. Appl. No. 14/259,540, mailed on Sep. 29, 2016, 7 pages.

* cited by examiner

ROUTING QUERIES BASED ON CARRIER PHRASE REGISTRATION

CROSS-REFERENCE TO RELATED APPLICATIONS

This patent application is a continuation of, and claims priority under 35 U.S.C. § 120 from, U.S. patent application Ser. No. 17/820,810, filed on Aug. 18, 2022, which is a continuation of U.S. patent application Ser. No. 16/747,814, filed on Jan. 21, 2020, which is a continuation of U.S. patent application Ser. No. 15/878,514, filed on Jan. 24, 2018, which is a continuation of U.S. patent application Ser. No. 15/196,429, filed on Jun. 29, 2016, which is a continuation of U.S. patent application Ser. No. 14/259,540, filed on Apr. 23, 2014, which is a continuation of U.S. patent application Ser. No. 12/851,666, filed on Aug. 6, 2010. The disclosures of these prior applications are considered part of the disclosure of this application and are hereby incorporated by reference in their entireties.

TECHNICAL FIELD

This document generally describes techniques, methods, systems, and mechanisms for routing queries made to an electronic device, such as a smartphone, and a platform for managing such routing.

BACKGROUND

A user of a mobile computing device such as an application telephone or smartphone, can download application programs to the mobile device from a network accessible application distribution platform (e.g., an on-line application marketplace), and run the application programs on the mobile device. The applications can take a variety of forms, and can be provided from third-parties via the on-line application marketplace.

Additionally, the mobile device may allow the user to provide inputs orally. For example, a user can press a button and speak a query "San Francisco Pizza Places" in order to view a list of search results that identify pizza places in San Francisco. Such oral input may speed a user's data input to the device compared to typed input, and can also enable use of the device when a user does not have the ability to provide typed input.

SUMMARY

This document describes techniques, methods, systems, and mechanisms for routing queries based on carrier phrase registration, such as on a mobile computing device. In general, third-party application programs (i.e., programs provided by individuals, companies or other organizations that are separate from the provider of the mobile device and the operating system for the mobile computing device) that are installed on the mobile computing device may register carrier phrases with a programming platform on the device that manages such registrations and routing. Carrier phrases are single words or groups of words that, instead of or in addition to being translated into text (e.g., for including in a document the user is editing), are used to trigger commands for the device. As described below, when a user of the mobile computing device orally speaks a voice query that includes a carrier phrase that a third-party application program has registered, the query (or a portion thereof) is provided to the third-party application program, or actions are performed by the third-party application program based on a content of the query.

In general, one aspect of the subject matter described in this specification can be embodied in a computer program product tangibly embodied in a computer-readable storage medium and storing instructions that when executed by a processor perform operations The operations include receiving, by a computing device, an orally-provided voice query and generating data that represents content of the voice query. The operations include providing the data by the mobile computing device to a server system. The operations include receiving, by the computing device and from the server system, a textual query that has been determined by a speech recognizer at the server system to be a textual form of at least part of the data. The operations include determining that the textual query includes a carrier phrase of one or more words that is reserved by a first third-party application program installed on the computing device. The operations include selecting the first third-party application, from a group of one or more third-party applications, to receive all or a part of the textual query. The operations include providing, by the computing device, all or a part of the textual query to the selected first application program.

Another aspect of the subject matter described in this specification can be embodied in a computer-implemented method. The method includes receiving, by a server system, a textual query that is a textual form of a voice query that was orally provided to a computing device. The textual query was determined by a speech recognition system from data that represented an audio recording of the voice query. The method includes determining, by the server system, that the textual query includes a carrier phrase of one or more words that is registered by a first third-party application program of a plurality of third-party application programs. Each of the plurality of third-party application programs has registered one or more carrier phrases in response to a request by or on behalf of the respective third party application program to register the respective carrier phrases. The method includes providing, by the server system and for receipt by the first application program at the computing device, a remaining portion of the textual query. The remaining portion of the textual query is a portion of the textual query that does not include the carrier phrase.

In yet another aspect, the subject matter described in this specification can be embodied in a computer-implemented system. The system includes a computer-implemented speech recognizer that is configured to (i) receive data that represents a content of a voice query that was orally provided to a computing device, and (ii) generate a textual query that is a textual representation of the data. The system includes a carrier phrase database that is programmed to (i) identify a plurality of third-party application programs that are provided by organizations that are different from an organization that provides the system, and (ii) identify a plurality of carrier phrases that have been assigned to respective of the third-party application programs in response to requests by the third-party application programs or providers of the third-party application programs to reserve the respective carrier phrases. The application programs are configured to be installed on the computing device. The system includes a computer-implemented query distributor programmed to (i) identify, in the textual query, a first carrier phrase from the plurality of carrier phrases, and (ii) identify a first third-party application program from the plurality of third-party application programs to which the first carrier phrase has been assigned in the carrier phrase database, so as to cause the query distributor to provide all or some of the textual query for receipt by the first third-party application program.

These and other implementations can optionally include one or more of the following features. The all or part of the textual query that is provided to the selected first application program may exclude the carrier phrase. The data may represent an audio recording of the orally-provided voice query. The orally-provided voice query may have been received by the computing device in response to a user selection of a button that is provided by the computing device for submitting voice queries. A content of the textual query may include words of a human-understandable language. The operations may include providing, by the computing device and to the first third-party application program, the carrier phrase.

The all or a part of the textual query may be provided to the first third-party application program so as to cause the first third-party application program to perform actions (i) that are defined by the first third-party application program and (ii) that are based on a content of the all or a part of the textual query. The operations may include determining that third-party application programs other than the first application program have not registered a carrier phrase that is included in the textual query. Each of the third-party application programs other than the first application program may not have been provided the all or a part of the textual query. Each of the third-party application programs may have been installed on the mobile computing device from an install file that was received at the computing device over a network. The install file for each third-party application program may have been received over the network in response to the mobile computing device receiving user input that requests receipt of the install file over the network.

Determining that the textual query includes the carrier phrase that is registered by the first application program may include comparing a beginning portion of the textual query to the carrier phrases registered by each of the plurality of application programs. The plurality of third-party application programs may include third-party application programs that have been installed on the mobile computing device. The plurality of third-party application programs may include web application programs that the mobile computing device has visited.

The all or some of the textual query may be a portion of the textual query that does not include the carrier phrase. The system may include a computer-implemented voice query encoder for generating the data based on the voice query that is orally provided to the mobile computing device by a user of the mobile computing device. The query distributor may be a component of an operating system of the mobile computing device. The query distributor may not provide third-party application programs that are not the first third-party application program the all or some of the textual query.

The first third-party application program may determine operations to perform based on a content of the all or some of the textual query. The determination of the operations to perform by the first application program may not be determined by the operating system. The determination of operations to perform by the first third-party application program may be defined by instructions that were included as part of an install file for the first third-party application program. The install file for the first application program may have been received at the computing device over a network in response to user input that requested receipt of the install file for the first application program.

The speech recognizer may generate the first carrier phrase based on a first language model. The speech recognizer may select, based on the first carrier phrase, a second language model from a plurality of language models that are assigned to carrier phrases. The speech recognizer may generate, from the voice query, a remaining portion of the first textual query that does not include the carrier phrase, based on use of the second language model. The query distributor may identify carrier phrases by comparing beginning portions of textual queries to carrier phrases. If the query distributor does not identify carrier phrases in a beginning portion of the textual queries, the query distributor may indicate that carrier phrases were not identified in the textual queries. The third-party application programs may be web applications that the mobile computing device has loaded upon visiting respective Uniform Resource Indicators (URI), and wherein the third-party web applications may not be installed on the mobile computing device.

Particular embodiments can be implemented, in certain instances, to realize one or more of the following advantages. A mobile device's oral communication interface may grow as third-party applications are installed. The communication interface may be flexible, depending on the applications that have been installed because the third-party applications may designate their own "carrier phrases." The flexibility of the communication interface may grow for both application users and developers. Such flexibility may encourage application providers to be more creative in their use of a computing platform, and may enable user's to receive a richer experience with their device, particularly with respect to speech-based interaction with the device.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
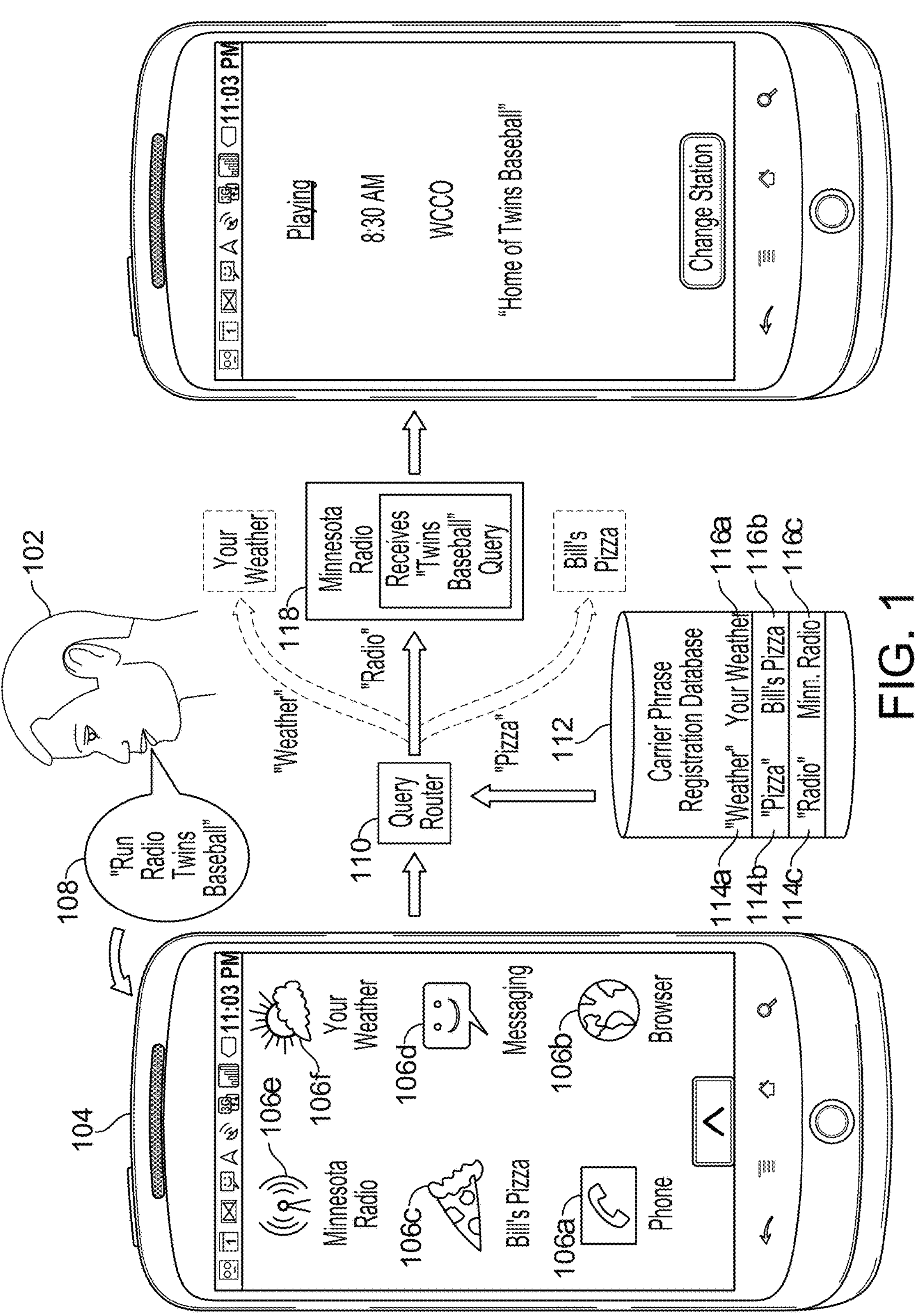
FIG. 1 conceptually illustrates a system for routing queries based on a carrier phrases that have been registered by third-party application programs.

This document generally describes routing queries to application programs based on a presence of carrier phrases in the queries. Individuals or organizations may develop application programs that are downloaded by users of mobile computing devices, and may execute the application programs in a traditional manner within an operating system on the devices. The developers may register one or more "carrier phrases" for their applications with the operating system, where the developers wish to reserve those carrier phrases as phrases that will cause certain commands to be performed by the particular applications or toward the applications. Thus, when a user of a mobile computing device submits a voice query that includes a carrier phrase, the device may identify one or more application programs that have registered the carrier phrase. The mobile computing device (e.g., via the operating system) may identify one of a plurality of applications that have registered the carrier phrase, and may deliver the query or a portion of the query to the identified application.

Information generated from the query may also be provided to an application that has reserved a carrier phrase in the query. For example, an application, when registering a carrier phrase, may identify actions that should be taken with respect to a portion of a query that is joined with a carrier phrase in the query. For example, an application may specify that a web search is to be performed on a portion of a query that follows a reserved carrier phrase or that a map is to be generated for an area around an address that is in the portion of the query, and that such information is then to be passed to the application. Thus, the query may be passed to the registering application as a raw query (i.e., in the form it was spoken) in whole or in part, or as a derived query (i.e., as information that is derived from the raw query, such as search results or a map that is responsive to the raw query).

In greater detail, users of mobile computing devices may use the devices to download application programs (also referred to as applications or apps). As an illustration, a user of a mobile telephone, Jim, may select an "application distribution platform" icon (e.g., an application marketplace) on the desktop of his mobile telephone. In response, the mobile telephone may display a list of application programs that Jim can download over the internet to the mobile telephone. Thus, Jim may the application marketplace to see available applications, and select certain applications for download and activation. The downloaded application programs, when executed, perform various tasks. For example, some application programs may allow Jim's mobile telephone to act as a voice recorder, some may stream internet radio stations, and some may be video games.

Jim may select an interface element for downloading a crossword puzzle game. The mobile telephone may download an install file for the crossword puzzle game from the internet, and execute the install file. An example installation includes unpacking of files supplied in a compressed form, copying the files to a suitable location in the mobile telephone's memory, tailoring the application software to suit the mobile telephone hardware and user preferences, and providing information about the application program to the telephone's operating system. To the user, a result of the installation process may include a new icon for the crossword puzzle application appearing on the mobile telephone's desktop or in list of the mobile telephone's application programs.

Jim may select the newly-generated icon for the crossword puzzle game, and the display of Jim's desktop may be replaced by a display for the crossword puzzle application program. Thus, the crossword puzzle application program may have "focus" and at least a portion of user input that is provided to a touchscreen of the mobile telephone may be forwarded to the crossword puzzle application program.

Jim's telephone may also store multiple other application programs that Jim has downloaded. For example, Jim's desktop may display an icon for a "Your Weather" application program. When Jim executes the weather application by selecting the icon, a display of the weather forecast for a present geographical location of Jim's mobile telephone is displayed. The display that is provided by the "Your Weather" application program may include a text box that enables Jim to enter a query for requesting a geographically-specific forecast. For example, Jim may select the text box and type either "San Francisco," "Golden Gate Bridge," or the zip code "94129" to get the current and projected weather for the region around the Golden Gate Bridge.

The applications that are available for user download through the internet-based application distribution platform may have been developed by various organizations and individuals that differ from the developers of Jim's telephone and its operating system, and thus may be referred to as third-party application programs. The application programs may not have shipped with the mobile computing device, and may not all be developed by a single organization. The application developers may each have registered a user account with the application distribution platform in order to upload one or more application programs for download by various users. The developers may set a price that is to be charged for the application program, and offer a description of the application program. The developers may also provide updates or patches to application programs that users have already downloaded. As discussed in more detail below, developers may also use their user accounts to register one or more "carrier phrases" for their respective application programs and on behalf of their respective application programs.

Jim's mobile telephone may allow Jim to submit voice queries to the mobile telephone. For example, the mobile telephone may include a physical query-input button on an outside of the mobile telephone, or may include a virtual query-input button (e.g., an icon that is displayed on a desktop of the mobile telephone). Selection of either query-input button may cause the mobile telephone to record audio with a microphone.

As an illustration, Jim may press the query button and state "Pizza Places." In response to Jim de-selecting the button or ceasing to speak, the mobile telephone may transmit digital data that represents encoded audio to a server system. The mobile telephone may receive, in return, information for displaying a list of search results that are responsive to the query "Pizza Places."

Jim's mobile telephone may listen for "carrier phrases" in the audio recording. A carrier phrase may be one or more words that are associated with a pre-defined action and that provide a context for a remaining portion of the query. In some examples, a carrier phrase begins an audio recording (or begins a portion of an audio recording that follows a previously spoken carrier phrase). In effect, speaking a carrier phrase as part of a voice query may cause a component of the mobile telephone or an application that is designated by the carrier phrase to "listen" to a remaining portion of the voice query. A carrier phrase can basically put an application program on notice that a user is speaking to the application program, and not to other application programs.

As an example, Jim may speak "Call 555-555-1234" into his mobile telephone. The query may be converted to text by a speech recognition system, and the mobile telephone may analyze a content of the text. The mobile telephone may identify the word "Call" as being a carrier phrase, and thus may provide the remaining portion of the user query (e.g., "555-555-1234") to a telephone dialing application program. Similarly, Jim may speak "Play Mandy," and the device may determine that Jim wants to invoke his telephone's music player to play Barry Manilow's song Mandy, either as stored on the device, or from a streaming music service.

In various examples, Jim's mobile telephone provides a platform for downloaded applications to reserve carrier phrases. Thus, applications may identify particular carrier phrases that cause a remaining portion of a voice query to be routed to the respective applications. The application programs may perform various actions based on a content of the remaining portion of the voice query. For example, Jim may download a music player application to his mobile telephone, where the install file for the music player includes data for requesting registration of the carrier phrases "Music" and "Play."

Suppose that Jim has installed the music player application, and wishes to play a song by the Beatles. Jim may press the voice-query input button on his mobile telephone and state "Music Play the Beatles." A digitally encoded audio file may be recorded and transmitted by the mobile telephone over the internet to a server system. The server system may receive the audio file and provide the audio file to a speech recognition system. The speech recognition system may output a textual representation of the spoken voice query. For example, the output of the speech recognition system may be the textual query "Music Play the Beatles."

The server system may provide the textual query to the mobile telephone. The mobile telephone may examine the textual query to determine if the textual query includes a carrier phrase. For example, the mobile telephone may examine a first word of the textual query to determine if the first word is found as a first word of any carrier phrases that have been reserved by applications that are installed on the mobile computing device (or that are pre-reserved by the operating system). In this example, the word "Music" has been reserved as a carrier phrase for the music player application.

In response to determining that the word "Music" is a reserved carrier phrase, the mobile computing device submits at least a remaining portion of the textual query to the music player application. For example, the mobile telephone may broadcast an "intent" that explicitly designates the music player application program, and passes to the music player application program the text "Play the Beatles." In some examples, the intent also passes the carrier phrase "Music" or an indication of a context of the text "Play the Beatles."

The music player application program receives the text "Play the Beatles" in an intent, along with information that indicates that the text was provided through a voice query. The music player application program may include a state machine for handling the input text. The state machine may begin in a starting state and determine if a first word in the textual query satisfies any of multiple transitions to different states. In this example, a transition to another state is identified by the term "Play," and thus, the state machine transitions to a second state, and the word play is consumed in the textual query (leaving the textual query "the Beatles").

The second state includes several transitions to new states, for example, "last song," "next song," and a transition for remaining phrases that do not satisfy either the "last song" or "next song" transitions. In this illustration, the text "the Beatles" does not satisfy the "last song" or "next song" transitions. Thus, the state machine transitions to a third state that is identified by the transition for the remaining phrases.

The third state does not include any transitions, and instead initiates a predetermined set of actions. In this illustration, the predetermined set of actions includes performing a search of the music player's media library using the remaining content of the textual query (e.g., "the Beatles"), filling a playlist with any responsive songs in an order sorted by relevance to the query, and playing a most-relevant song in the query.

Jim's mobile telephone plays music for several hours, and Jim decides that he wants to pause the music. Jim presses the query-input button and speaks the voice query "music stop." As described above, the mobile computing device passes the textual query "stop" to the music player application program, which pauses the music in accordance with operations defined by the state machine. The state machine may be defined in the music player's install file, or may be defined in communications received from a server system that is identified by a Uniform Resource Identifier (URI) specified in the install file.

In another illustration, Jim may later state "Weather Duluth Minnesota." The mobile telephone may determine that the carrier phrase "Weather" is reserved for a weather application program, and send the text "Duluth Minnesota" to the weather application. The weather application may be configured to run a search for a place that is identified by text that is received in response to a "Weather" carrier phrase, and display current weather and a forecast for the identified place. In this example, the weather application displays the current weather and a weekend forecast for Duluth, Minnesota.

In another implementation, a server system may, in response to the submission of the audio file, interpret the query and return the forecast information along with the carrier phrase "weather"—the device may then use the carrier phrase to provide the information to the weather application that has reserved the carrier phrase "weather," without that application having to separately fetch the forecast information.

In various examples, the music player application program reserves the carrier phrase "Music," but does not receive any portion of the textual query. Instead, the mobile computing device determines an action that the music player application program may perform and issues a command to the music player application program.

For example, Jim may state "Music sync." The mobile telephone may identify that the music player application has reserved the carrier phrase "Music." The mobile telephone may then identify if a remaining portion of the query begins with any of predefined terms that the mobile telephone has reserved for the carrier phrase. In this illustration, the mobile telephone has reserved the predefined words "sync," "quit," and "random." The mobile telephone identifies that the query includes the word snyc, generates a request that a target application program perform a music library syncing operation, and directs the request to the music player application program. Each of multiple carrier phrases may include predefined words and associated actions. If none of the predefined words are identified in the remaining portion of the query, the remaining portion may be provided to the application program, as described above.

In some examples, the server system uses the identified carrier phrase to select a targeted speech recognition model to use for recognizing speech in a remaining portion of the voice query. In the above example, the server system identifies that the voice query begins with the phrase "music play." In response to this identification, a language model that has been trained on artist and song names may be selected.

The language model that is selected for the phrase "music play" may weight more heavily words that are commonly used to name artists and songs than a language model that is used to identify words in normal conversation. Similarly, the language model that is selected may be more likely to correctly select words based on preceding words. For example, a speech recognition system using a language model for normal speech may incorrectly determine that a voice query for "Modest Mouse" corresponds to the text "modest house." In contrast, when the speech recognition system is using a language model for the above-described music database, the speech recognition system may output the correct text "Modest Mouse."

In various examples, multiple application programs reserve a same carrier phrase. For example, the music player application program and an internet radio application program may both reserve the carrier phrase "Music." In some examples, the early bird may get the worm. Thus, if the music player application program is installed first, the carrier phrase "Music" is reserved for that application program. If the internet radio application is later downloaded: (i) the carrier phrase "Music" may not be assigned to it, (ii) the mobile telephone may prompt Jim that the internet radio application is trying to reserve the carrier phrase "Music," and request user-input to override the reservation of the carrier phrase by the music player application, or (iii) the mobile telephone may allow multiple application programs to reserve a single carrier phrase.

In the example where the mobile telephone allows multiple application programs to reserve a single carrier phrase, Jim may not be notified when the internet radio application is installed. Should Jim speak a voice query that begins with the word "Music," however, the mobile telephone may prompt Jim to specify which of the application programs that have reserved the word "Music" are to receive the query. In some examples, an indication of Jim's user-selection of one of the application programs is stored by the mobile telephone, and subsequent queries that include the same carrier phrase are directed to the application that Jim designated. Jim may change his carrier phrase designations in a carrier phrase management interface.

In some examples where multiple applications have reserved the word "Music," the mobile telephone may select an application program for handling a query that includes the carrier phrase "Music" based on a current state of the multiple application programs. For example, even though the internet radio application program was installed second, if the internet radio application program is currently executing and playing music, Jim's query may be directed to the internet radio application program without prompting Jim. Various mechanisms for selecting one of multiple application programs based on a state of the application programs are discussed throughout this document, for example, in relation to FIG. 5

Identifying an appropriate application for a carrier phrase may also depend on information from a server system. For example, if a video player application and a music player application have both reserved the carrier phrase "play," and a user submits the query "Play Mandy," the server system may search a music database and a movie or video database for relative prevalence of the song title and the movie (or television) title in available databases, and may pass back relevant information to reflect, e.g., that Mandy is a popular song (at least in some groups) so that the device will invoke the music player rather than the video player.

In various examples, mechanisms are implemented to limit an amount of carrier phrases that are "active" (e.g., those carrier phrases that, when uttered, cause the query to be routed to an application program)—in effect, to avoid carrier phrase spam. Should multiple applications each be able to designate any carrier phrase, and a limitless quantity of carrier phrases, a user may not be able to be able to input voice queries without unintentionally triggering actions by various application programs.

In some examples, carrier phrases that have been reserved by application programs are activated if the carrier phrases follow a predefined carrier phrase. For example, only when a voice query includes a reserved carrier phrase that immediately follows the word "Run" are the voice queries routed to the reserving application programs. Thus, if a user submits the voice query "Run Music Play the Beatles," the above described operations may occur. If the user submits the voice query "Music Play the Beatles," another operation may occur. For example, a web search may be performed on the text "Music Play the Beatles," and a list of responsive search results may be displayed on a screen of the mobile computing device.

In some examples, application programs can only reserve carrier phrases in a predetermined list of carrier phrases that the mobile telephone has designated. Thus, the words "music" and "search" may be designated as available for reservation by various application programs, but the words "sunscreen" and "corrosion" may not.

In some examples, a user of the mobile telephone may view a list of carrier phrases that have been reserved by application programs and "activate" or "deactivate" carrier phrases for particular application programs. In some examples, a user of the mobile telephone may define carrier phrases for each of the particular application programs (e.g., by typing the letters "Map" in a configuration field for a mapping application). The user may further also associate "action words" that follow a carrier phrase with predetermined actions. For example, the voice query "Map" by itself may cause the mapping application to launch. The mapping application may allow a user to associate an action word with an operation for zooming in. The user may, therefore, type the word "closer" into a field for association with the zooming in action. Thus, when the user submits the voice query "Map closer," the map may zoom in.

In some examples, each application program is limited in the number of carrier phrases that it may register. For example, an application program may be allowed to reserve no more than 0, 1, 2, 3, 4, or 5 carrier phrases. The number of carrier phrases may be automatically set for each application program based on use of the application program by the user of the mobile telephone (e.g., Jim), or automatically set based on a popularity of the application program (e.g., a number of downloads of the application program by a plurality of users, or a frequency of use of the application program by a plurality of users).

In various examples, the carrier phase must begin the query, or follow another carrier phase or designated word. Thus, the mobile computing device may stop "looking" for carrier phases once a user has spoken an initial word or phrase that is not identified as a carrier phrase, and has broken into free-form prose. Thus, the query "Restaurants in New York that have good music" may not invoke the music player application because "music" is not a first word of the query. In some examples, a carrier phrase may be a last word of the voice query.

In various examples, carrier phrases are reserved for application programs through a networked database. As an illustration, a developer of the music player application may submit the music player application program to an application distribution platform for discovery by and distribution to users of mobile telephones. The developer may log into a developer's portal for the application distribution platform using a username and password. The developer may be able to designate carrier phrases that should be reserved for the application program.

Accordingly, an identification of carrier phases in a voice query may be performed at the server system instead of by the mobile telephone. The server system may obtain a list of applications that have been installed on a mobile telephone and identify a carrier phrase that is in the voice query and that has been reserved by an application that is installed by the mobile telephone. In various examples, the server system checks the query for carrier phrases from a "global" database of applications. The check of the global database may identify, in the voice query, carrier phrases that have been reserved by applications that are not installed on the mobile telephone. In some examples, the applications are web applications that are associated with websites.

A carrier phrase may be reserved by a web application. A web application may be a website that is interactive or that includes executable resources (e.g., javascript). A web application may be executable in a browser controlled environment. Example web applications include online shopping websites, internet-based email clients, and games that are playable using a web browser. As described in more detail throughout this document, even though a user has not installed a particular application on his mobile telephone, a query by the user can invoke the particular application if the user states a carrier phrase that the particular application has reserved. For example, web applications may be "assigned" to a particular user account, so that when a user of a mobile telephone logs into the mobile telephone with the user account, the web applications are provided to the mobile telephone for use.

In various examples, an application is transmitted voice query voice data in response to the user speaking a carrier phrase that the application has reserved. As an illustration, a user may state "voice memo buy milk at the grocery store." The server system may identify a textual representation of the audio recording and determine that the carrier phrase "voice memo" has been reserved by an "Audio Recorder" application program. The Audio Recorder application may allow a user to record and playback portions of audio. Accordingly, the Audio Recorder application program may request that it receives an audio recording of a voice query in response to identification of the carrier phrase "voice memo" in the query. In some examples, the textual query is sent with the recording of the audio, for example, so that a transcription of the audio recording may be displayed along with the audio recording.

In some examples, a developer of an application program reserves an "example phrase" and the mobile computing device or a server system determines similar phrases that should be reserved for the application, or whether a submitted query is similar to the example phrase and should be provided to the application. As an illustration, a developer may create an application program that is for booking tables at restaurants. The application developer may upload the application to an application marketplace, and indicate that the application should recognize phrases like "book a table at $RESTAURANT for $NUM people on $DATE at $TIME."

A server system may determine, when the application is uploaded or during runtime after a query is submitted, that a of "make a reservation for $NUM people at $RESTAURANT," which is similar to the reserved query, may be provided to the same application. Accordingly, a developer may need not specify every possible query that may be used to invoke operations by an application program.

In various examples, the similar queries may be determined by the server system using a machine learning system. For example, the machine learning system may categorize a type of an application program (e.g., the system may categorize the above described application as a restaurant reservation application). The system may receive as input reserved carrier phrases and queries for various applications that are restaurant reservation applications. The machine learning system may output to the application a set of carrier phrases and queries that may include all of the reserved carrier phrases and various combinations of the reserved carrier phrases for the restaurant reservation applications.

For example, the system may determine that an application program has reserved a carrier phrase and query structure that include similar variables to carrier phrase and query structures of other applications, but that starts with the words "reserve a table." Thus, new carrier phrases and query structures that mimic existing carrier phrases for various restaurant reservation applications, but that start with "reserve a table" instead of "book a table" or "make a reservation" may be reserved for an application.

FIG. 1 conceptually illustrates a system for routing queries based on carrier phrases that have been registered by third-party application programs. In this illustration, an individual 102, Frank, is using the mobile telephone 104. Several application programs have been installed on the mobile telephone 104. At least some of these application programs are designated by icons that are displayed on a background of the mobile telephone's "desktop" display. For example, the mobile telephone shipped to Frank with the "Phone" application 106*a* pre-installed. Similarly, the "Browser" 106*b* and the "Messaging" 106*d* application programs also came pre-installed. Frank, however, may have visited an application marketplace website and downloaded the "Bill's Pizza" 106*c*, "Minnesota Radio" 106*e* and "Your Weather" 106*f* application programs.

Bill selects a voice query-input interface element that is displayed on the screen of the mobile computing device, awaits an acknowledging "beep," and speaks the query "Run Radio Twins Baseball" 108. The voice query is provided to a speech recognition system (not shown), which translates the audio recording into a textual query. The textual query is provided to a query router 110. The query router 110 accesses a carrier phrase registration database 112 to identify if the textual query includes a carrier phrase that has been reserved by an application program.

The carrier phrase registration database 112 indicates that the carrier phrase "weather" 114*a* has been reserved by the "Your Weather" application program 116*a*. Similarly the carrier phrase "pizza" 114*b* has been reserved by the "Bill's Pizza" application program 116*b*, while the carrier phrase "radio" 114*c*" has been reserved by the "Minnesota Radio" application program 116*c*. The query router 110 is configured to route the textual query (or a portion thereof) to the application program that has registered the carrier phrase that is found in the textual query.

In this example, the query 108 begins with the application designator "Run." The application designator may cause the query 108 to be routed to the query router 110. Should a user not begin the query with the word "Run," search engine results that are responsive to the voice query may be returned to the user.

The first word after "Run" is "Radio." Accordingly, the query router 110 determines that the query 108 (or a portion thereof) should be routed to the Minnesota Radio application program 118. In various examples the Minnesota Radio application program receives a portion of the textual query that does not include the carrier phrase (e.g., the application receives only the phrase "Twins Baseball"). In various examples, the application program receives the full textual query. In various examples, the application program receives the voice query (or a portion thereof).

The Minnesota Radio application program may perform a query of radio stations using the phrase "Twins Baseball." The searching system may prioritize highest those stations that have a matching station AM or FM number, a matching call sign, or a matching description, in this order. In this illustration, the searching system does not find a matching station number or call sign, but is able to identify a station that has descriptive text that includes the phrase "Twins Baseball." Accordingly, the Minnesota Radio application program 118 plays the matching radio station.

Figure 2:
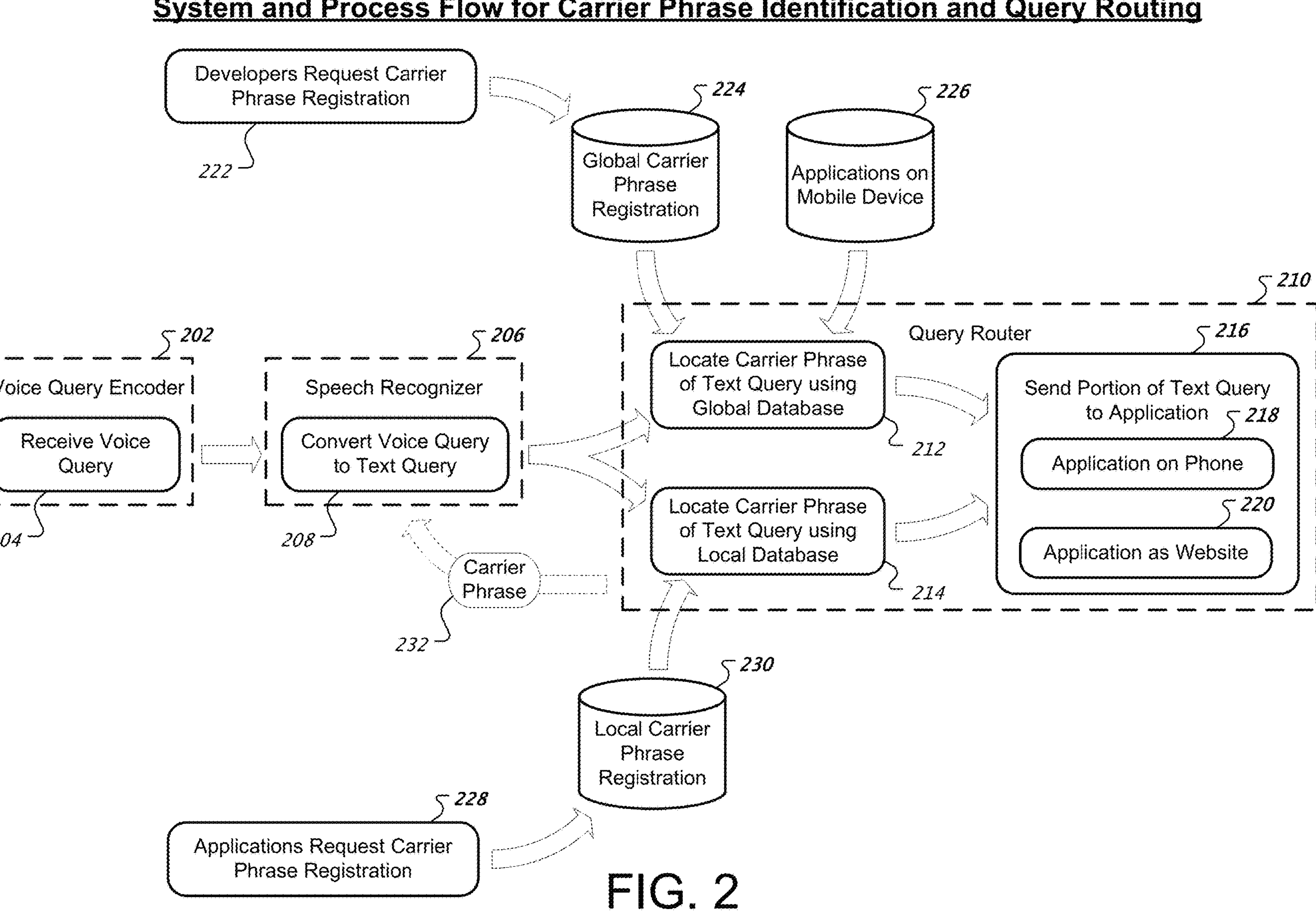
FIG. 2 illustrates a system and process flow for performing carrier phrase identification and query routing.

FIG. 2 illustrates a system and process flow for performing carrier phrase identification and query routing. In general, a voice query is received by a voice query encoder 202, and converted to a textual query by a speech recognizer 206. The textual query is provided to a query router 210, which identifies a carrier phrase in the query (boxes 212 and 214) and sends at least a portion of the textual query to an application program that reserved the carrier phrase (box 216). Carrier phrases can be registered by application programs (box 228), or by developers (box 222).

Application programs may register carrier phrases (box 228). For example, the install file for an application program may include text that identifies one or more carrier phrases that the application program may attempt to register upon installation. Should a mobile computing device download and install the application program, the mobile computing device may update the local carrier phrase registration database 230 to indicate the registration of one or more carrier phrases by the application program.

In various examples, application programs request registration of carrier phrases in response to a communication from a server system. For example, a developer may distribute a game that, when installed, can query a central server system for updates or miscellaneous information (e.g., a list of high scores for the game). The developer may use the server system to push to installed games a communication, that when received by the games, causes the games to request registration of a carrier phrase that is identified in each communication. Registration of carrier phrases by application programs is discussed in more detail with respect to FIG. 3.

In various examples, developers can register carrier phrases (box 222). For example, a developer may log into a developers' portal for an application distribution platform, and identify one or more carrier phrases that the developer would like to register for each of the developer's downloadable application programs. The carrier phrase registrations may be stored in the global carrier phrase registration database 224.

A voice query encoder 202 receives a voice query (box 204). For example, a mobile telephone may include one or more components that detect user-selection of a query input button, and begin recording audio using a microphone. The audio input signal may be encoded in digital information. The voice query encoder 202 may be located at a mobile computing device at which the voice query was received. The voice query encoder 202 may provide the digital information to a speech recognizer 206.

A speech recognizer 206 receives the digital information and accesses one or more language model to convert the digital encoding of the voice query into a textual query (box 208). The speech recognizer 206 may be located at the mobile computing device or at a server system that is remote from the mobile computing device.

A query router 210 may receive the textual query, find a carrier phrase in the textual query, and send at least a portion of the textual query to an application program that has reserved the textual query. The query router 210 may be located at the server system, the mobile device, or split among both computing systems.

In box 214, a carrier phrase in the textual query is located in the local carrier phrase database 230. For example, the local carrier phrase database 230 may be stored on the mobile computing device and may identify those carrier phrase that have been reserved by application programs that are installed at the mobile computing device. In various examples, the local carrier phrase registration database 230 is stored remote from the mobile computing device.

In box 212, a carrier phrase in the textual query is located in the global carrier phrase database 224. For example, the query router 210 may access a database of all application programs that are provided by an application distribution platform, and may determine if the textual query includes a carrier phrase that is registered by any of the application programs.

Figure 5:
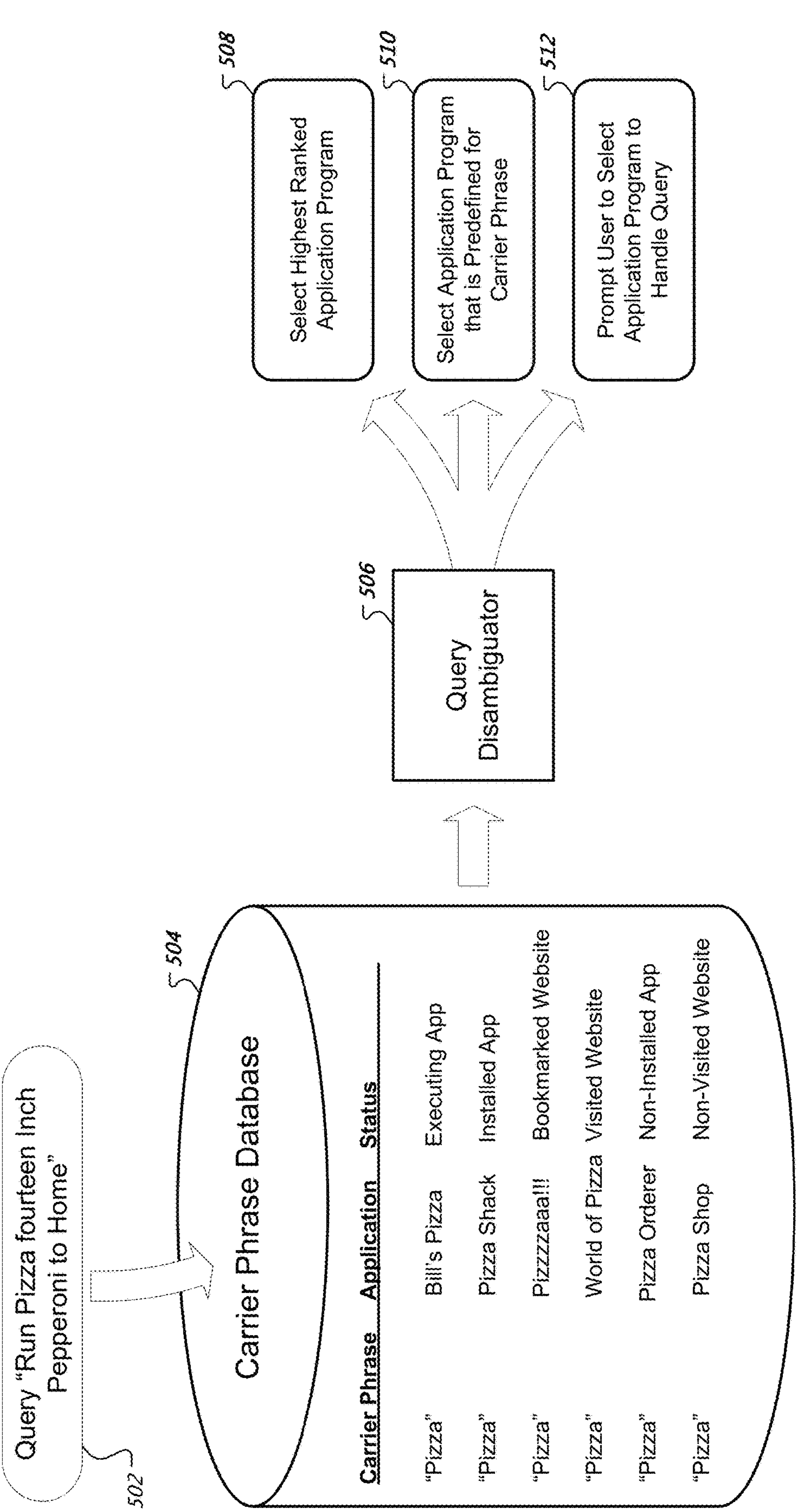
FIG. 5 conceptually illustrates a disambiguation of queries.

The query router 210 may perform disambiguation of a query phrase if a carrier phrase is registered to more than one application program (as described in more detail with relation to FIG. 5). In various examples, the query router 210 limits an identification of carrier phrases in the textual query to those carrier phrases that have been registered to applications that are installed on the mobile device. Thus, the query router 210 may receive as input a list of applications that are installed on the mobile device 226.

Locating carrier phrases in the global database (box 212) may be performed alternatively or in conjunction with locating carrier phrases in the local database (box 214). In some examples, the global carrier phrase database 224 is queried if no carrier phrase is identified in the local carrier phrase database 230.

In some examples, after the carrier phrase is identified, the carrier phrase 232 is provided to the speech recognizer 206. The speech recognizer 206 may select a different language model, or a subset of the previously used language model, to perform speech recognition operations on the remaining portion of the voice query. Thus, the carrier phrase may provide a "context" from which to select a language model. In various examples, the query router 210 provides the speech recognizer 206 an identification of the application program that has been selected as registered for the carrier phrase, or an identification of the language model with which to perform the remaining speech recognition.

In box 216, the query router 210 transmits the textual query or a portion thereof for receipt by the application program that has been selected as registered for the carrier phrase. The transmission may occur as a system "intent" that identifies the application program and the textual query.

The application program may be a website (box 220). In this case, the query router 210 may request resources from the website, where the textual query (or an encoding thereof) is appended as a query parameter to the URI in the request for website resources. A server system that hosts the website may receive the request, extract the query parameter, and perform operations based on a content of the query parameter. For example, the website may perform a search of a database using the textual query and return to the mobile computing device the results of the search.

Figure 3:
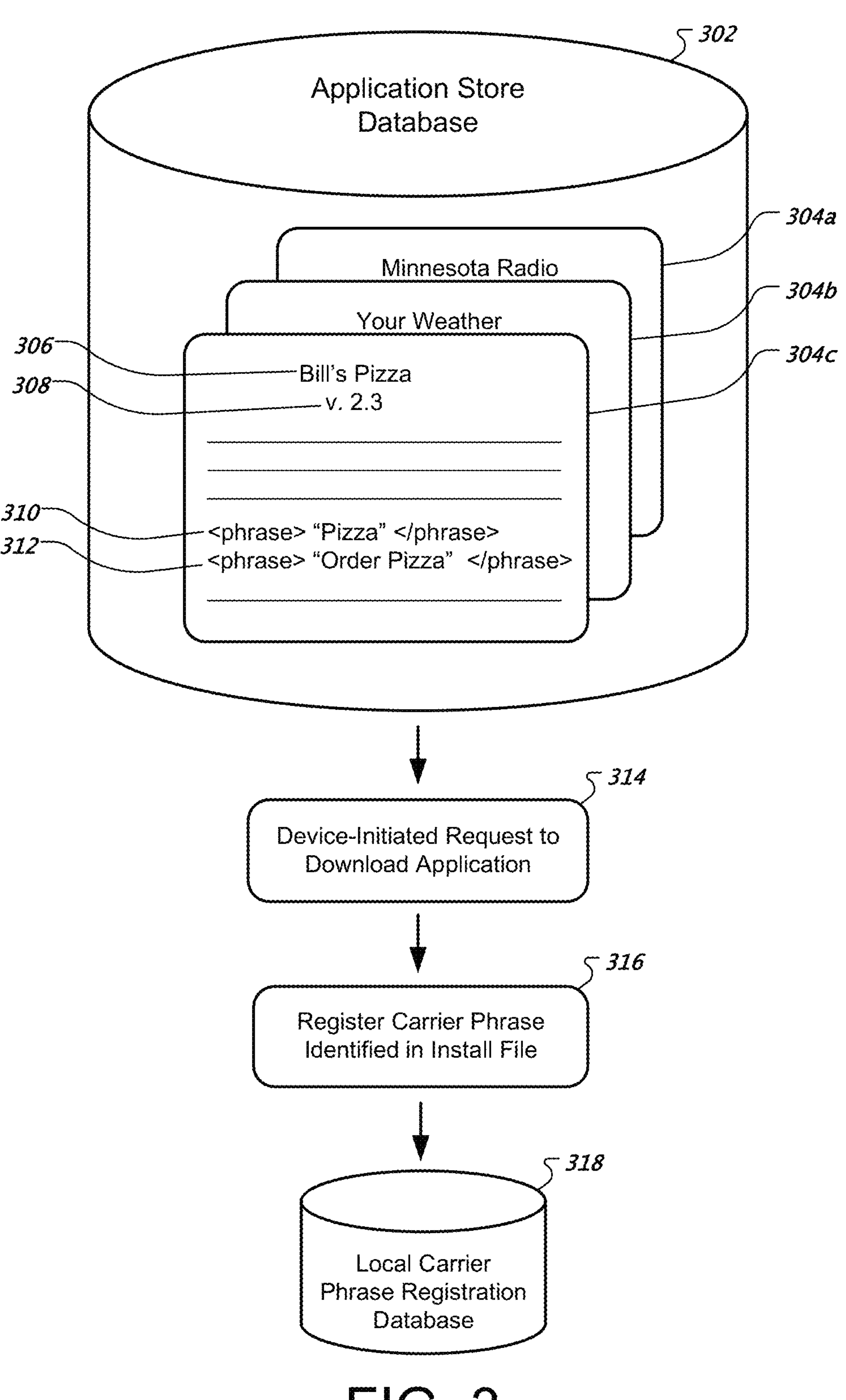
FIG. 3 illustrates local carrier phrase registration.

FIG. 3 illustrates local carrier phrase registration. Local carrier phrase registration may be a registration of carrier phrases for only those applications that a user has installed. The install files for the applications may have been downloaded from an application distribution platform database 302. The application distribution platform database 302 may store install files 304*a-c* for a plurality of application programs. The install files may include carrier phrase registration requests. For example, the install file for the Bill's Pizza application may identify a name 306 of the application, a version identifier 308, a request 310 to register the carrier phrase "Pizza," and a request 312 to register the carrier phrase "Order Pizza."

In box 314, a mobile computing device initiates a request to download an application install file. For example, a user of a mobile telephone may visit an application distribution platform website and select a "download" button that is associated with the Bill's Pizza install file 304*c*. In box 316, the one or more carrier phrases that are identified in the install file are registered in the local carrier phrase registration database 318. The registration may be performed automatically during the installation process. A user may not manually provide user input that places the carrier phrases in the local carrier phrase registration database 318.

Figure 4:
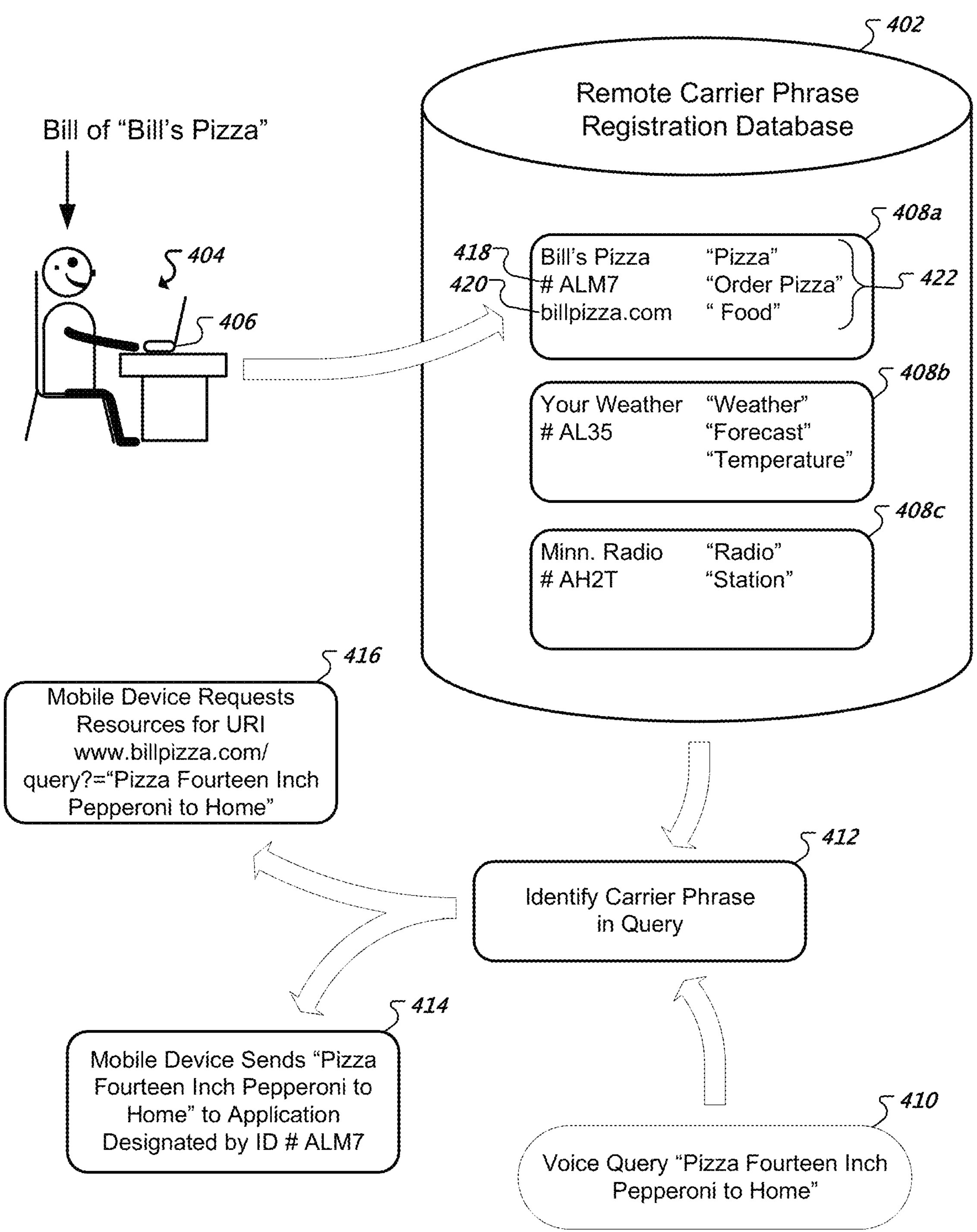
FIG. 4 illustrates remote carrier phrase registration.

FIG. 4 illustrates remote carrier phrase registration. In this illustration, the request for carrier phrase registration may not be included in an install file for an application. Instead, a developer of the application program may submit the request to a server system, which may register the carrier phrase for the application program. The server system may communicate with a query routing system that identifies application programs to which textual queries may be routed. For example, "Bill" runs a pizza store that is named "Bill's Pizza." Bill develops an application program, appropriately named "Bill's Pizza," that allows individuals to order pizzas using their mobile telephones. Bill places the application program on a website for users to download with their mobile telephones.

Bill also logs into a system for designating carrier phrases for his application program. Bill designates the carrier phrases "Pizza," "Order Pizza," and "Food." The remote carrier phrase registration database 402 includes records 408*a-c* that identify application programs, and carrier phrases that have been designated for each particular application program. In this example, the record 408*a* includes an application program identifier 418 for uniquely identifying, among other application programs, the Bill's Pizza application program. The record 408*a* also includes a URI 420 of a website that may host a Bill's Pizza web application program, and the three carrier phrases 422 that Bill has reserved.

In box 410, a mobile computing device has received a voice query "Pizza fourteen inch pepperoni to home." The query is converted to text and a query router identifies a carrier phrase in the textual query (at box 412). The carrier phrase is identified by determining if a first word of the query is a reserved carrier phrase, or if a first set of words is a reserved carrier phrase. If a beginning word or set of words in the textual query is not identified as any of the carrier phrases in the registration database 402, a default action for the textual query may be performed (e.g., identifying search results that are responsive to the textual query).

In this illustration, the carrier phrase "Pizza" is identified as having been reserved by the "Bill's Pizza" application program. In examples where the Bill's Pizza application is installed on the mobile computing device, the mobile device generates a message that is addressed to the application program that is designated by the unique identifier #ALM7, and that includes as content the phrase "fourteen inch pepperoni to home" (box 414).

In some examples, the Bill's Pizza application is not installed on the mobile computing device, but is a web application. Accordingly, the mobile device may request resources for a URI that is identified in the registration database 402, and append the textual query as a query parameter to the URI (box 416).

FIG. 5 conceptually illustrates a disambiguation of queries. In this illustration, the query "pizza fourteen inch pepperoni to home" is received at a query router, and the query router identifies six application programs that have registered the carrier phrase "Pizza." The query router provides the list of six application programs to a query disambiguator 506. The query disambiguator performs operations for identifying a single of multiple application programs to which the query is to be routed.

As illustrated in carrier phrase database 504, the six application programs that have registered the carrier phrase "Pizza" have different statuses. A status may designate a level of interaction between a mobile device (or a user account that is logged into the mobile device) and the respective application program. For example, the "Bill's Pizza" application is presently executing. An application program may be executing if: (i) the application has focus of the entire display or a significant portion thereof, (ii) if the application is operating a widget that is currently displaying on a desktop of the mobile computing device, or (iii) the application is operating in the background, but a different application program has visible "focus."

As indicated by the status "Installed App," the "Pizza Shack" application program has been installed on the mobile computing device, but may not be not currently executing. For example, the application may not have been launched by the operating system upon starting the mobile computing device, and the user may not have provided user input to launch the application program.

As indicated by the status "Bookmarked Website," the "Pizzzzaaa!!!" application program may be a web application program that is bookmarked on the mobile computing device. In other words, a user of the mobile computing device may have visited the web application and saved an identifier for a URI that is associated with the Pizzzzaaa!!! application, to enable efficient future retrieval of the resources. A web application may also be considered bookmarked if a shortcut to the web application displayed as an icon, for example, on the desktop of the mobile computing device. User selection of the website may invoke a display of the web application in a web hosted environment. Web application resources may be retrieved from an application cache on the mobile computing device.

As indicated by the status "Visited Website," the "World of Pizza" application program may be a web application program that the user of the mobile computing device has visited, but has not bookmarked.

As indicated by the status "Non-Installed App," the "Pizza Orderer" application program may be available to the user of the mobile computing device for download, but may not have been downloaded to the mobile computing device.

As indicated by the status "Non-Visited Website," the "Pizza Shop" application program may be a web application program that the user of the mobile computing device has not visited.

The query disambiguator 506 may select one of the application programs that have registered the "Pizza" carrier phrase, and pass the textual query 502 to the selected application program (or to the query router for transmission to the selected application program). For example, the query disambiguator 506 may select a highest ranked application program (box 508). A highest ranked application program may be the application program that is associated with a most favorable application status. The application statuses in the carrier phrase database 504 are ranked in an example order of descending priority. Thus, in this illustration, the query 502 may be forwarded to the "Bill's Pizza" application program.

In some examples, the query 502 is forwarded to an application program without user-input only if the application program is associated with a subset of the application statuses that indicate a level of user interaction with the application program. For example, if the only application programs that registered the carrier phrase "Pizza" were a non-installed application and a non-visited website, the query may not be forwarded to the registering application programs. Instead, the user may be prompted that the voice query includes a carrier phrase for the application programs. The prompt may enable the user to route the query one of the application programs or not route the query (and perform a default action using the voice query). Routing the query to the application program may include downloading and installing the application program, and thereafter having the application program perform operations based on the content of the query.

In some examples, the query disambiguator 506 routes the query to an application program that is predefined for the carrier phrase (box 510). Even though the carrier phrase may have been registered by many application programs, a user of the mobile computing device may have designated one of the application programs to receive the query. The user may perform the designation in a carrier phrase configuration display.

In some examples, the query disambiguator 506 prompts the user to select one of the application programs that has registered the carrier phrase "Pizza." The prompt may be visual or audible, and the user may respond with physical or oral feedback.

In various examples, the applications that are installed for a user are stored on a networked system (e.g., in the "cloud"). Thus, a user may speak a voice query into his mobile device, and a recording of the voice query may be transmitted to a server system for conversion into a textual query, comparison to application programs that are identified at the server system for the user, and routing to the application programs. The application programs may be executing at the server system and may perform the execution of the textual query at a server system.

In various examples, reference throughout this documents to registration of a carrier phrase "by an application program" may include registration of the carrier phrase "by a developer of the application program."

In various examples, application programs do not reserve a carrier phrase, but reserve an "application type" that is associated with a carrier phrase. For example, the "listen to" carrier phrase may be designated as associated with an "music playback" application type. Multiple applications may have registered for the "music playback" application type, and thus may receive a voice query that includes the carrier phrase "listen to." Disambiguation between the various application may occur, as described above.

In various examples, a carrier phrase is not identified unless it is followed by a pause. For example, the voice query "Music . . . the Beatles" may cause a music player to start playing the Beatles. On the other hand, the voice query "Music the Beatles" may cause the mobile computing device to display a list of search results that are responsive to the search query "Music the Beatles."

Figure 6:
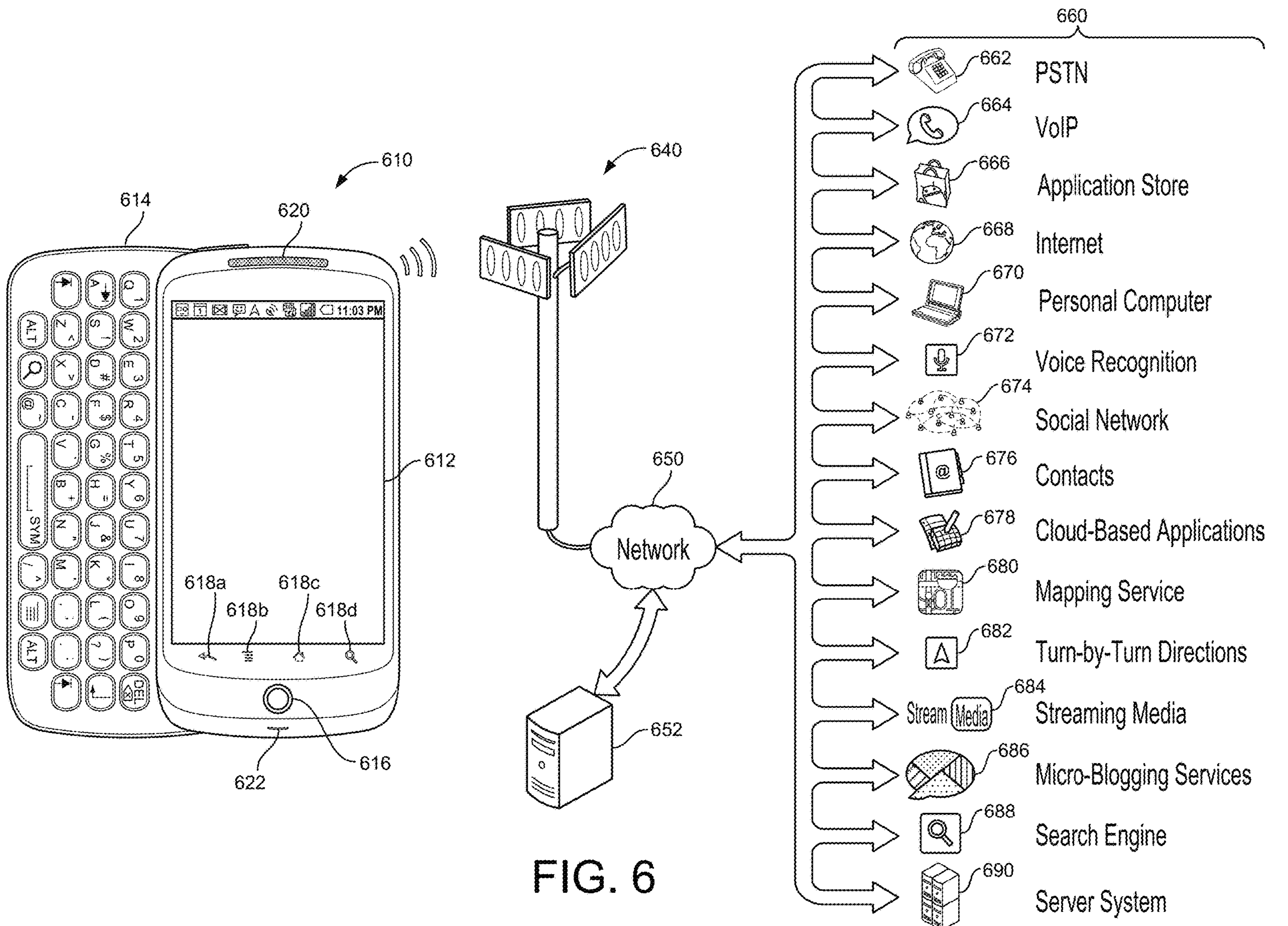
FIG. 6 is a conceptual diagram of a system that may be used to implement the systems and methods described in this document.

Referring now to FIG. 6, a conceptual diagram of a system that may be used to implement the systems and methods described in this document is illustrated. Mobile computing device 610 can wirelessly communicate with base station 640, which can provide the mobile computing device wireless access to numerous services 660 through a network 650.

In this illustration, the mobile computing device 610 is depicted as a handheld mobile telephone (e.g., a smartphone or an application telephone) that includes a touchscreen display device 612 for presenting content to a user of the mobile computing device 610. The mobile computing device 610 includes various input devices (e.g., keyboard 614 and touchscreen display device 612) for receiving user-input that influences the operation of the mobile computing device 610. In further implementations, the mobile computing device 610 may be a laptop computer, a tablet computer, a personal digital assistant, an embedded system (e.g., a car navigation system), a desktop computer, or a computerized workstation.

The mobile computing device 610 may include various visual, auditory, and tactile user-output mechanisms. An example visual output mechanism is display device 612, which can visually display video, graphics, images, and text that combine to provide a visible user interface. For example, the display device 612 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 612). Further, the mobile computing device 610 may include one or more speakers 620 that convert an electrical signal into sound, for example, music, an audible alert, or voice of an individual in a telephone call.

An example mechanism for receiving user-input includes keyboard 614, which may be a full qwerty keyboard or a traditional keypad that includes keys for the digits '0-9', '*', and ' #.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application distribution platform 666 may provide a user of the mobile computing device 610 the ability to browse a list of remotely stored application programs that the user may download over the network 650 and install on the mobile computing device 610. The application distribution platform 666 may serve as a repository of applications developed by third-party application developers. An application program that is installed on the mobile computing device 610 may be able to communicate over the network 650 with server systems that are designated for the application program. For example, a VoIP application program may be downloaded from the Application distribution platform 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
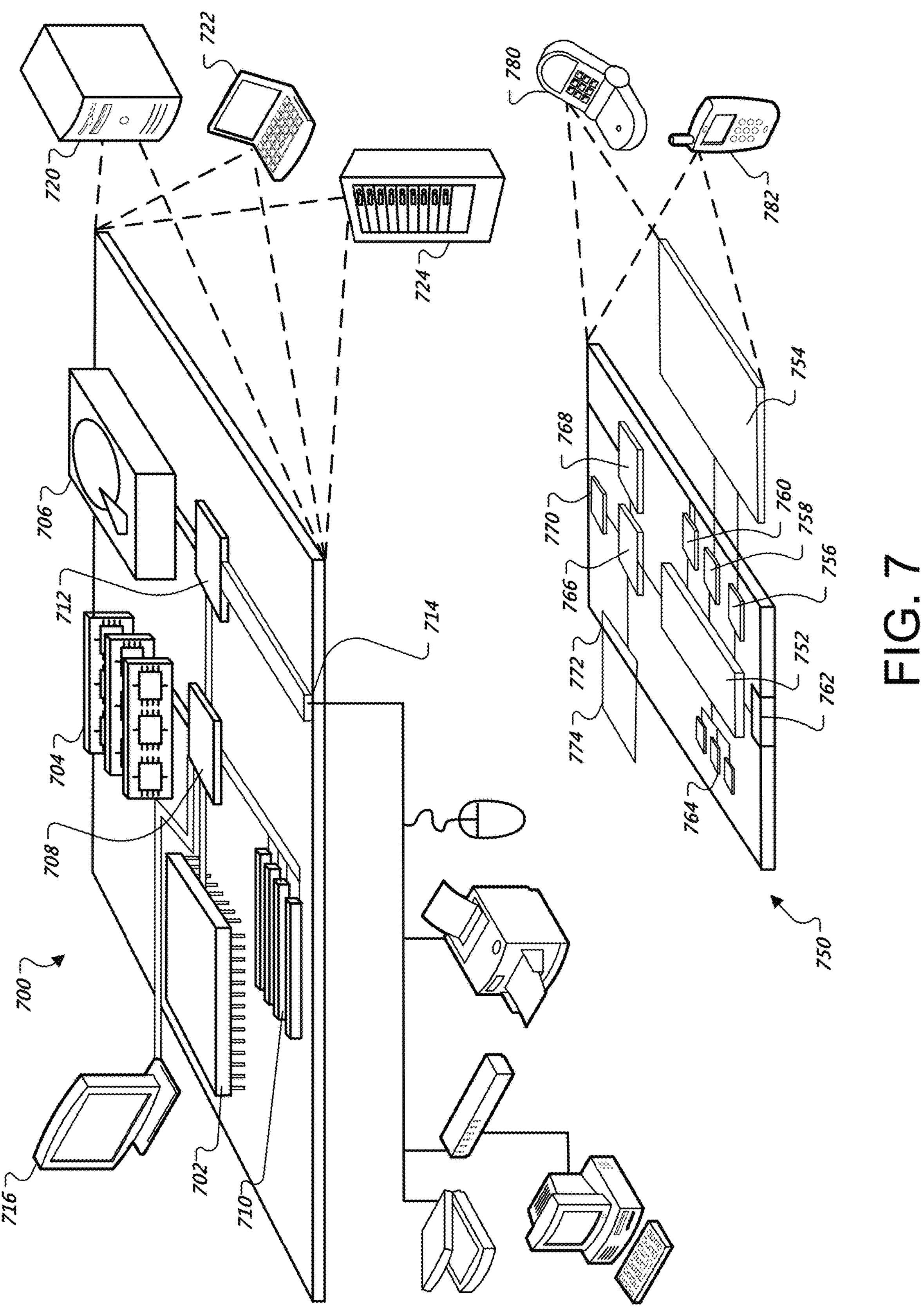
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by data processing hardware that causes the data processing hardware to perform operations comprising:

receiving a voice input captured by a computing device, the voice input comprising a beginning portion and a remaining portion;

determining that the beginning portion matches a particular carrier phrase from among a plurality of carrier phrases, each respective carrier phrase associated with a corresponding application and a corresponding pre-defined action;

based determining that the beginning portion matches the particular carrier phrase, converting the remaining portion of the voice input into a textual representation; and instructing the corresponding application to perform the corresponding pre-defined action using the textual representation of the remaining portion of the voice input, the corresponding application and the corresponding pre-defined action each associated with the particular carrier phrase, wherein the particular carrier phrase has been registered by a third-party application program in response to a request by or on behalf of the third-party application program to reserve the particular carrier phrase.

2. The computer-implemented method of claim 1, wherein the operations further comprise:

determining that the corresponding application associated with the particular carrier phrase is assigned to a particular user account associated with a user of the computing device, wherein instructing the corresponding application to perform the corresponding pre-defined action using the textual representation of the remaining portion of the voice input is based on determining that the corresponding application is assigned to the particular account.

3. The computer-implemented method of claim 1, wherein the plurality of carrier phrases are stored on memory hardware of the computing device.

4. The computer-implemented method of claim 1, wherein:

the computing device is associated with a user; and receiving the voice input comprises:

recording, using a microphone, an audio input signal characterizing the voice input spoken by the user; and encoding, using a voice query encoder residing on the computing device, the audio input signal into a digital representation of the voice input.

5. The computer-implemented method of claim 4, wherein a speech recognizer resides on the computing device and is configured to convert the digital representation of the voice input into the textual representation of the remaining portion of the voice input.

6. The computer-implemented method of claim 1, wherein the operations further comprise, after determining that the beginning portion matches the particular carrier phrase:

identifying the corresponding application associated with the particular carrier phrase to perform the corresponding pre-defined action; and determining that the particular carrier phrase is reserved by corresponding application for invoking the corresponding application when the particular carrier phrase is spoken by a user of the computing device.

7. The computer-implemented method of claim 1, wherein the corresponding application associated with the particular carrier phrase executes on a remote server system in communication with the computing device.

8. The computer-implemented method of claim 7, wherein the remaining portion of the voice input comprises a subject associated with the corresponding pre-defined action associated with particular carrier phrase.

9. The computer-implemented method of claim 1, wherein the beginning portion of the voice input comprises one or more words.

10. The computer-implemented method of claim 1, wherein the corresponding application associated with the particular carrier phrase is not installed on the computing device.

11. A computing device comprising:

data processing hardware; and memory hardware in communication with the data processing hardware and storing instructions that when executed by the data processing hardware cause the data processing hardware to perform operations comprising:

receiving a voice input captured by the computing device, the voice input comprising a beginning portion and a remaining portion;

determining that the beginning portion matches a particular carrier phrase from among a plurality of carrier phrases, each respective carrier phrase associated with a corresponding application and a corresponding pre-defined action;

based determining that the beginning portion matches the particular carrier phrase, converting the remaining portion of the voice input into a textual representation; and instructing the corresponding application to perform the corresponding pre-defined action using the textual representation of the remaining portion of the voice input, the corresponding application and the corresponding pre-defined action each associated with the particular carrier phrase, wherein the particular carrier phrase has been registered by a third-party application program in response to a request by or on behalf of the third-party application program to reserve the particular carrier phrase.

12. The computing device of claim 11, wherein the operations further comprise:

determining that the corresponding application associated with the particular carrier phrase is assigned to a particular user account associated with a user of the computing device, wherein instructing the corresponding application to perform the corresponding pre-defined action using the textual representation of the remaining portion of the voice input is based on determining that the corresponding application is assigned to the particular account.

13. The computing device of claim 11, wherein the plurality of carrier phrases are stored on memory hardware of the computing device.

14. The computing device of claim 11, wherein:

the computing device is associated with a user; and receiving the voice input comprises:

recording, using a microphone, an audio input signal characterizing the voice input spoken by the user; and encoding, using a voice query encoder residing on the computing device, the audio input signal into a digital representation of the voice input.

15. The computing device of claim 14, wherein a speech recognizer resides on the computing device and is configured to convert the digital representation of the voice input into the textual representation of the remaining portion of the voice input.

16. The computing device of claim 11, wherein the operations further comprise, after determining that the beginning portion matches the particular carrier phrase:

identifying the corresponding application associated with the particular carrier phrase to perform the corresponding pre-defined action; and determining that the particular carrier phrase is reserved by corresponding application for invoking the corresponding application when the particular carrier phrase is spoken by a user of the computing device.

17. The computing device of claim 11, wherein the corresponding application associated with the particular carrier phrase executes on a remote server system in communication with the computing device.

18. The computing device of claim 17, wherein the remaining portion of the voice input comprises a subject associated with the corresponding pre-defined action associated with particular carrier phrase.

19. The computing device of claim 11, wherein the beginning portion of the voice input comprises one or more words.

20. The computing device of claim 11, wherein the corresponding application associated with the particular carrier phrase is not installed on the computing device.

* * * * *